US010379793B2

(12) United States Patent
Tokumoto

(10) Patent No.: US 10,379,793 B2
(45) Date of Patent: Aug. 13, 2019

(54) COMMUNICATION TERMINAL AND METHOD OF CONTROLLING THE SAME, AND STORAGE MEDIUM

(71) Applicant: CANON KABUSHIKI KAISHA, Tokyo (JP)

(72) Inventor: Hirokazu Tokumoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/978,522

(22) Filed: May 14, 2018

(65) Prior Publication Data
US 2018/0335987 A1    Nov. 22, 2018

(30) Foreign Application Priority Data

May 18, 2017  (JP) ................................. 2017-099213

(51) Int. Cl.
  *G06F 3/12*   (2006.01)
  *H04W 4/23*   (2018.01)
  *H04M 1/725*  (2006.01)
  *H04W 64/00*  (2009.01)
  *H04W 4/80*   (2018.01)

(52) U.S. Cl.
  CPC .......... *G06F 3/1226* (2013.01); *G06F 3/1204* (2013.01); *G06F 3/126* (2013.01); *G06F 3/1236* (2013.01); *G06F 3/1292* (2013.01); *H04M 1/7253* (2013.01); *H04W 4/23* (2018.02); *H04W 4/80* (2018.02); *H04W 64/006* (2013.01); *H04M 2250/02* (2013.01)

(58) Field of Classification Search
  CPC ...... G06F 3/1226; G06F 3/126; G06F 3/1204; G06F 3/1292; H04W 64/006; H04W 4/23; H04M 1/7253
  USPC ....................................................... 358/1.14
  See application file for complete search history.

(56) References Cited

U.S. PATENT DOCUMENTS

| 2016/0255218 A1* | 9/2016 | Takahashi .......... H04N 1/00323 |
| | | 358/1.15 |
| 2016/0269384 A1* | 9/2016 | Suga ....................... H04L 63/08 |
| 2017/0127278 A1* | 5/2017 | Yamamoto ............ H04W 12/06 |

FOREIGN PATENT DOCUMENTS

JP          2013153271 A    8/2013

* cited by examiner

*Primary Examiner* — Neil R McLean
(74) *Attorney, Agent, or Firm* — Rossi, Kimms & McDowell LLP

(57) ABSTRACT

A program for causing a communication terminal having a wireless communication function to save a first threshold set in common to a plurality of apparatuses and a second threshold set in association with each apparatus, the first and second thresholds being compared with an acquired intensity of an radio wave to determine whether or not an apparatus that has transmitted the radio wave and the communication terminal are in a predetermined proximity state. By comparing the obtained intensity of the radio wave with one of the saved first and second thresholds, it is determined whether or not the apparatus that has transmitted the radio wave and the communication terminal are in proximity to each other. In accordance with an update instruction, one of the saved first and second thresholds is updated.

15 Claims, 13 Drawing Sheets

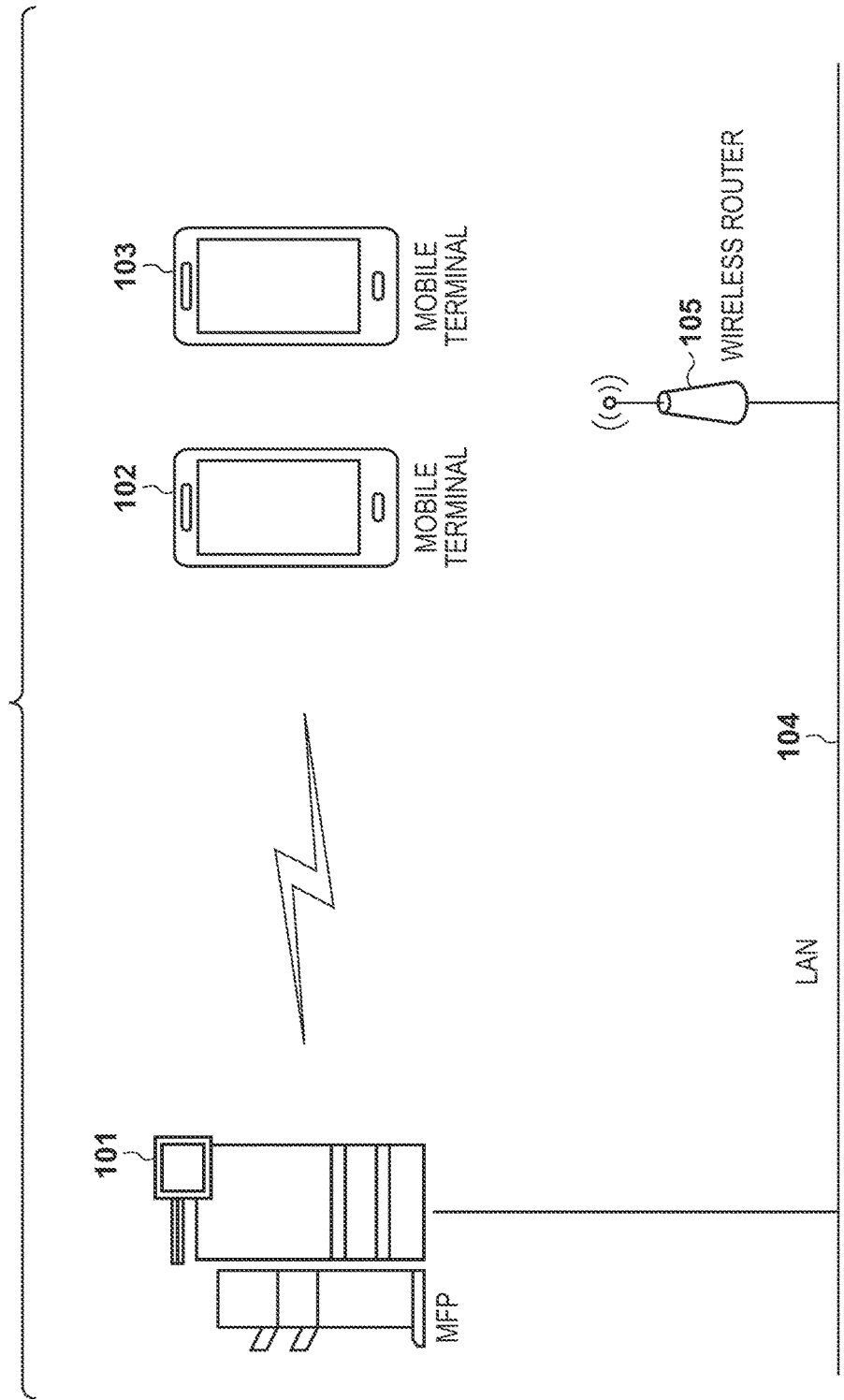

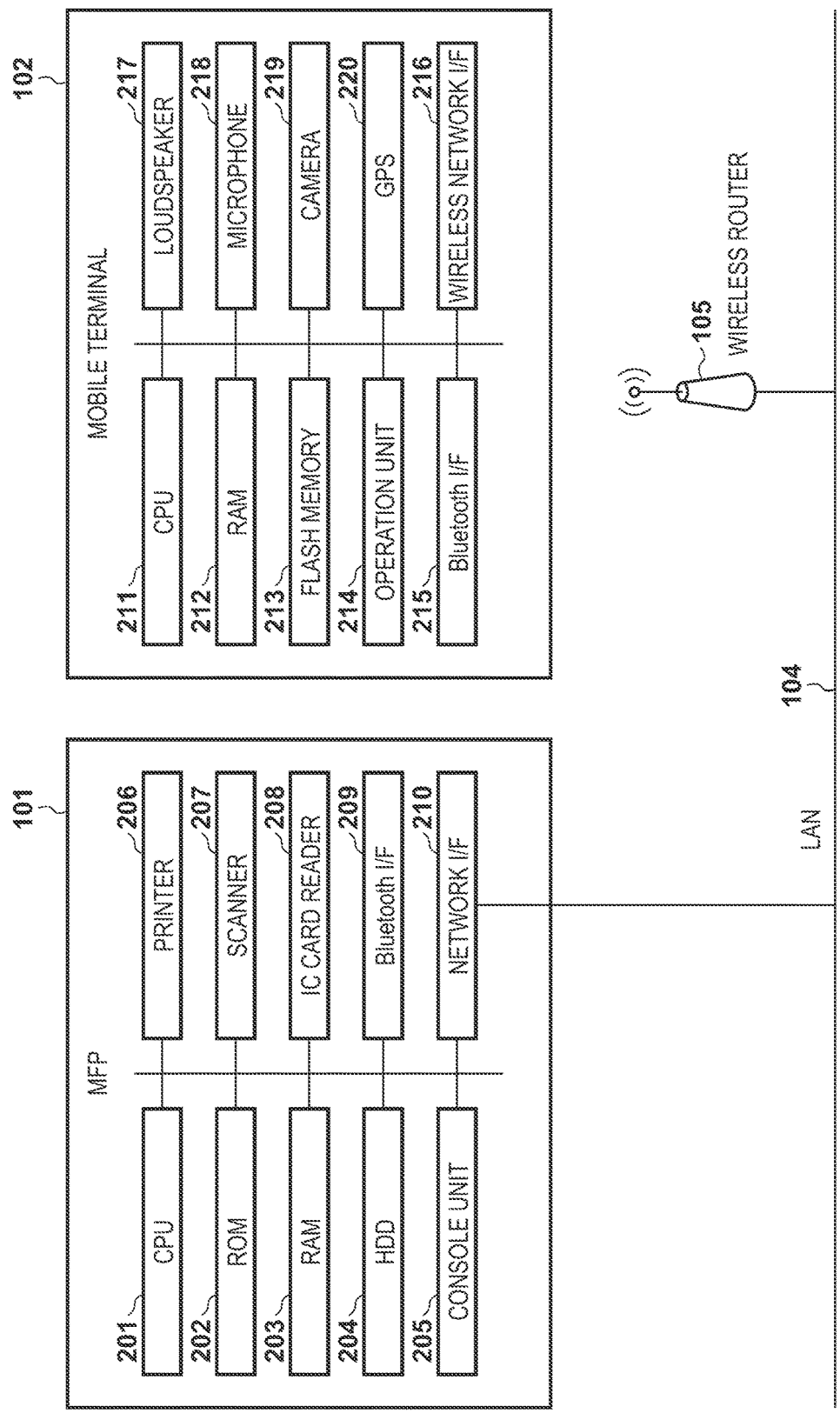

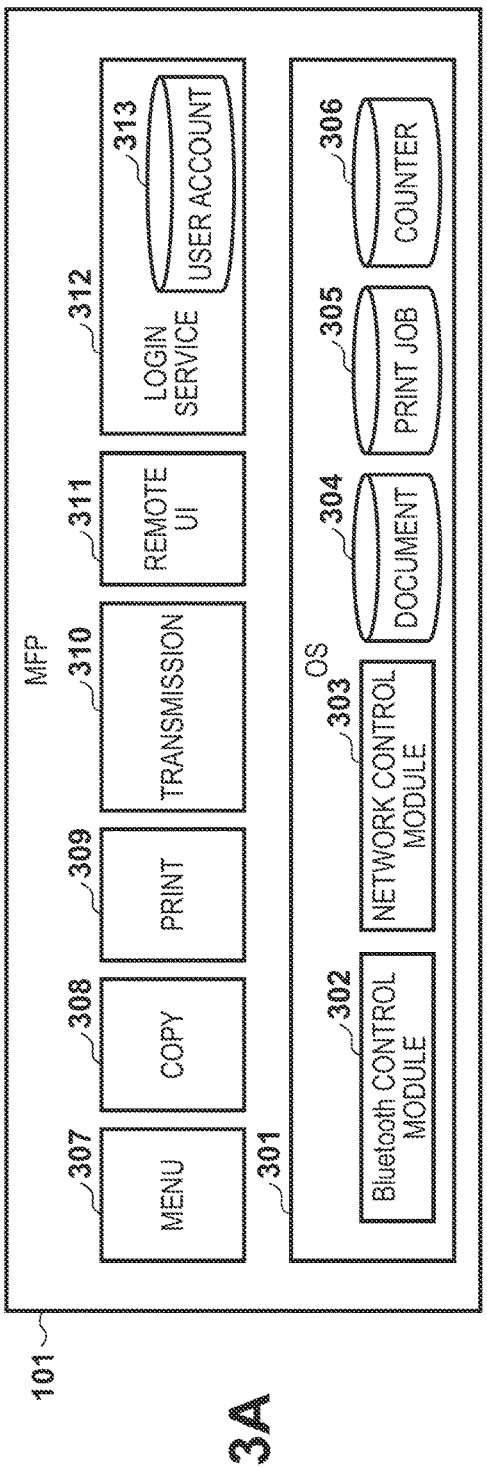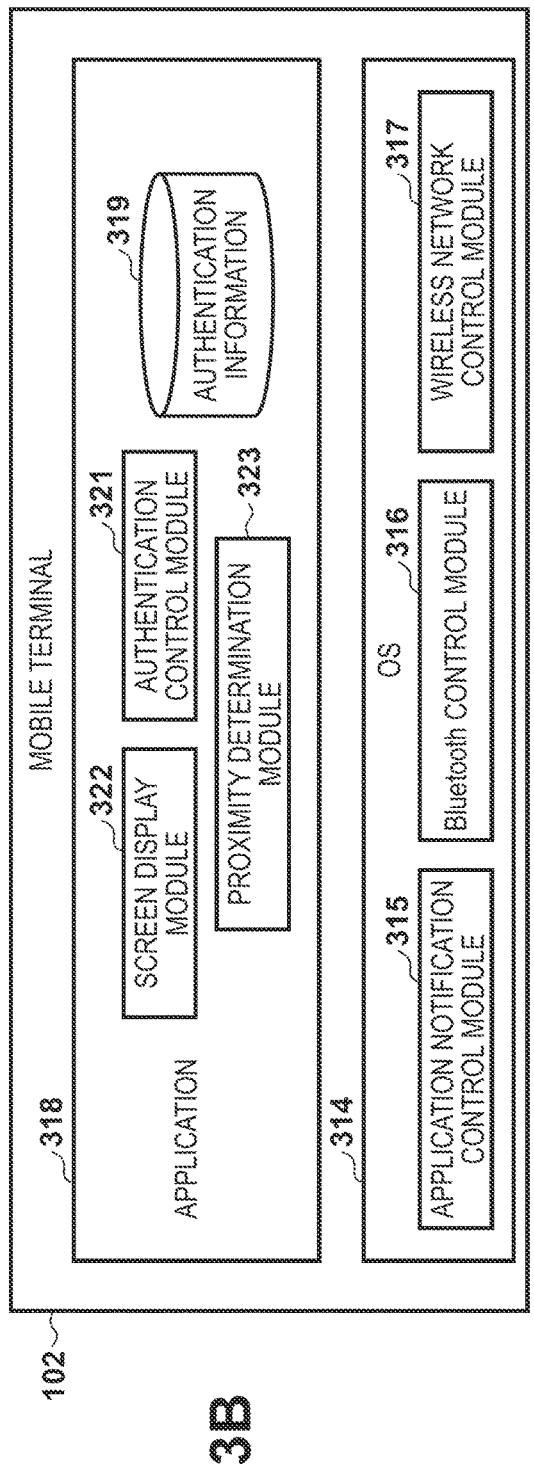
FIG. 3A
FIG. 3B

FIG. 10A

| | RSSI THRESHOLD (dBm) |
|---|---|
| COMMON | −60 |

| | RSSI THRESHOLD (dBm) |
|---|---|
| MFP | −60 |
| LBP | −40 |
| MFP-1 | none |

1001

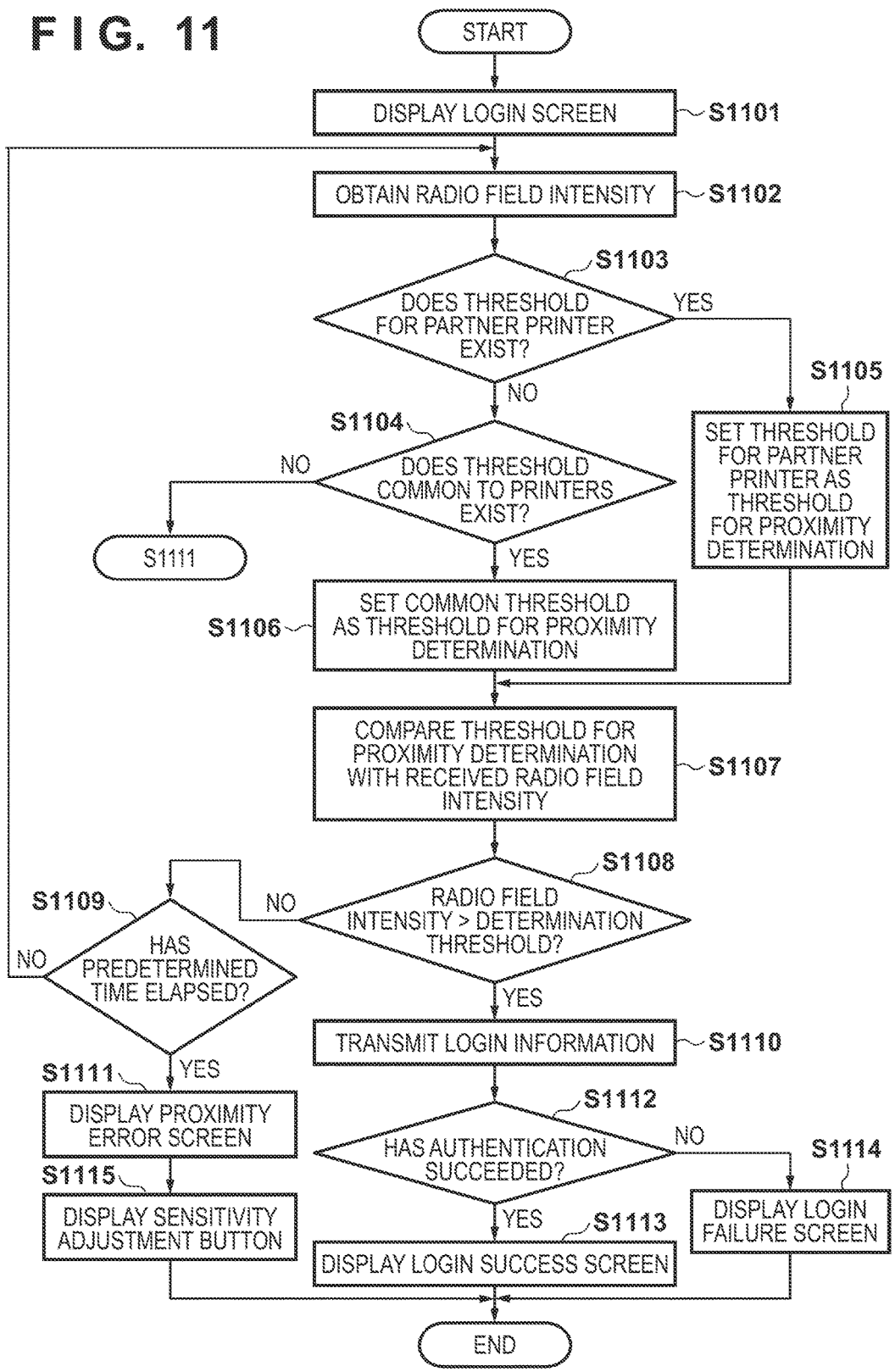

COMMUNICATION TERMINAL AND METHOD OF CONTROLLING THE SAME, AND STORAGE MEDIUM

BACKGROUND OF THE INVENTION

Field of the Invention

The present invention relates to a communication terminal and a method of controlling the same, and a storage medium.

Description of the Related Art

In recent years, information processing apparatuses such as a multi-function peripheral and a printer having wireless communication functions such as a wireless LAN and BLE (Bluetooth Low Energy) functions are increasing. This allows a user to perform wireless communication with such information processing apparatus using a mobile terminal, pair the mobile terminal with the information processing apparatus based on information obtained by the wireless communication, and then perform various kinds of processing such as login processing and print processing.

Since radio field intensity in wireless communication generally has the property of attenuating in inverse proportion to the square of distance, it is possible to estimate the distance between the mobile terminal and the information processing apparatus based on the radio field intensity received by the mobile terminal. In addition, in terms of security, it is determined, based on the radio field intensity received by the mobile terminal from the information processing apparatus, whether or not the mobile terminal and the information processing apparatus are in a proximity state in which they are in proximity to each other within a predetermined distance. If it is determined that the mobile terminal and the information processing apparatus are in proximity to each other, processing of the information processing apparatus is made executable. For example, login processing from the mobile terminal to the information processing apparatus by a specific user and processing of inputting information from the mobile terminal to the information processing apparatus are executed after the determination (to be referred to as proximity determination hereinafter) of whether the mobile terminal and the information processing apparatus are in proximity to each other within the predetermined distance.

As a related art of proximity determination in a mobile terminal with respect to an information processing apparatus, for example, there is Japanese Patent Laid-Open No. 2013-153271. In this technique, to correctly determine whether or not a mobile terminal is in proximity to a wirelessly communicable information processing apparatus, a threshold to be used for the determination is generated and held for each information processing apparatus, and then it is determined using the threshold whether or not the mobile terminal is in proximity to the information processing apparatus.

The radio field intensity received by the mobile terminal from the information processing apparatus largely depends on a measurement environment. However, the above-described technique can improve the accuracy of determination of whether the mobile terminal and the information processing apparatus are in proximity to each other.

SUMMARY OF THE INVENTION

A feature of the present invention is to provide a technique of improving the convenience of the user of a communication terminal in proximity determination between the communication terminal and a target apparatus.

According to a first aspect of the present invention, there is provided a non-transitory computer readable storage medium storing a program for causing a processor to execute a method of controlling a communication terminal having a wireless communication function, the method comprising: obtaining an intensity of a received radio wave; saving, in a memory, a first threshold set in common to a plurality of apparatuses and a second threshold set in association with each apparatus, the first and second thresholds being compared with the obtained intensity of the radio wave to determine whether or not an apparatus that has transmitted the radio wave and the communication terminal are in a predetermined proximity state; determining, by comparing the obtained intensity of the radio wave with one of the first threshold and the second threshold saved in the memory, whether or not the apparatus that has transmitted the radio wave and the communication terminal are in proximity to each other; and updating, in accordance with an update instruction, one of the first threshold and the second threshold saved in the memory.

According to a second aspect of the present invention, there is provided a method of controlling a communication terminal having a wireless communication function, comprising: obtaining an intensity of a received radio wave; saving, in a memory, a first threshold set in common to a plurality of apparatuses and a second threshold set in association with each apparatus, the first and second thresholds being compared with the obtained intensity of the radio wave to determine whether or not an apparatus that has transmitted the radio wave and the communication terminal are in a predetermined proximity state; determining, by comparing the obtained intensity of the radio wave with one of the first threshold and the second threshold saved in the memory, whether or not the apparatus that has transmitted the radio wave and the communication terminal are in proximity to each other; and updating, in accordance with an update instruction, one of the first threshold and the second threshold saved in the memory.

According to a third aspect of the present invention, there is provided a communication terminal having a wireless communication function, comprising: a memory device that stores a set of instructions; and at least one processor that executes the instructions stored in the memory device to function as: an obtaining unit that obtains an intensity of a received radio wave; a saving unit that saves a first threshold set in common to a plurality of apparatuses and a second threshold set in association with each apparatus, the first and second thresholds being compared with the intensity of the radio wave obtained by the obtaining unit to determine whether or not an apparatus that has transmitted the radio wave and the communication terminal are in a predetermined proximity state; a determination unit that determines, by comparing the intensity of the radio wave obtained by the obtaining unit with one of the first threshold and the second threshold saved in the saving unit, whether or not the apparatus that has transmitted the radio wave and the communication terminal are in proximity to each other; and an update unit that updates, in accordance with an update instruction, one of the first threshold and the second threshold saved in the saving unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a schematic view showing the overall configuration of a system according to an embodiment of the present invention;

FIG. 2 is a block diagram for explaining the hardware arrangements of an MFP and a mobile terminal according to the embodiment;

FIGS. 3A and 3B are functional block diagrams for respectively explaining the software arrangements of the MFP and the mobile terminal according to the embodiment;

FIGS. 10A and 10B depict views illustrating tables each showing an example of a threshold table used by the mobile terminal to perform proximity determination with respect to the MFP according to the embodiment; and FIG. 11 is a flowchart for describing processing when the mobile terminal is brought closer to the MFP to log in to the MFP according to the embodiment.

DESCRIPTION OF THE EMBODIMENTS

Figure 4B:
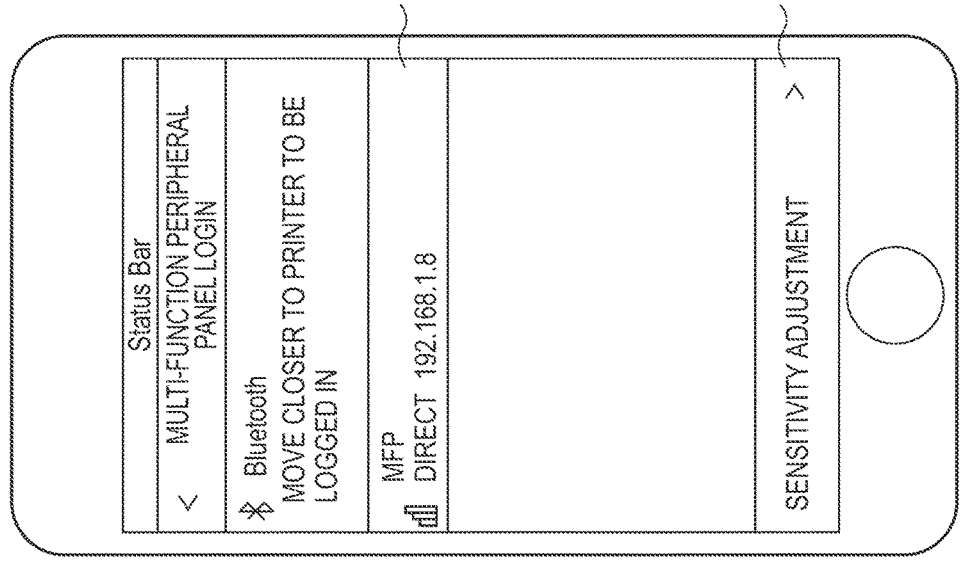
FIGS. 4A to 4D depict views each showing an example of the screen of the login function of the mobile terminal according to the embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In this embodiment, to improve the accuracy of proximity determination, a result of threshold adjustment executed with each information processing apparatus is stored for each information processing apparatus, and made usable for determination of the degree of proximity to the information processing apparatus. Furthermore, to improve the convenience of a user, a common threshold to be used for determination of the degree of proximity to an information processing apparatus for which no threshold adjustment has individually been performed is stored, thereby making it possible to determine, using the common threshold, the degree of proximity to the information processing apparatus for which no adjustment has individually been performed. By appropriately using the two kinds of thresholds, it is possible to improve the convenience when performing processing using, as a trigger, entering a proximity state with respect to the information processing apparatus. The embodiment will be described below with reference to the accompanying drawings.

FIG. 1 depicts a schematic view showing the overall configuration of a system according to the embodiment of the present invention.

This system includes a plurality of MFPs as information processing apparatuses and a plurality of mobile terminals. Assume, for example, an office environment in which each person has one mobile terminal, and always carries it. The MFPs are provided and installed in the office environment. An MFP (Multi Function Peripheral) 101 and mobile terminals 102 and 103 are examples. The mobile terminals 102 and 103 are possessed by different users.

The MFP 101 is connected to a LAN (Local Area Network) 104, and can mutually communicate with other terminals connected to the LAN 104. Similarly, the mobile terminals 102 and 103 are connectable to the LAN 104 via a wireless router 105, and can mutually communicate with other terminals connected to the LAN 104. Furthermore, the MFP 101 and the mobile terminals 102 and 103 have a Bluetooth® communication function, and can be interconnected to communicate with each other within a range where a Bluetooth radio wave reaches.

FIG. 2 is a block diagram for explaining the hardware arrangements of the NFP 101 and the mobile terminal 102 according to the embodiment. Note that the hardware arrangement of the mobile terminal 103 is the same as that of the mobile terminal 102 and a description thereof will be omitted.

A CPU (Central Processing Unit) 201 of the MFP 101 controls the overall operation of the MFP 101. The CPU 201 executes a boot program stored in a ROM 202, reads out a program stored in an HDD 204 to deploy it in a RAM 203, and executes the deployed program, thereby controlling the operation of the NFP 101. The RAM (Random Access Memory) 203 is a volatile memory used by the CPU 201 as a work area or the like to execute various programs. The HDD (Hard Disk Drive) 204 stores image data and various programs. A console unit 205 includes a display unit operating as a touch panel that can be operated by a user's finger. A printer 206 prints an image on a sheet based on image data transferred via an internal bus under the control of the CPU 201. A scanner 207 generates image data by reading an image on a document. An IC card reader 208 reads an IC card used for user authentication. A Bluetooth I/F 209 is an interface for performing wireless communication in accordance with the Bluetooth standard, and mutually communicates with another apparatus including a Bluetooth I/F. In the embodiment, the Bluetooth I/F 209 mutually communicates with the mobile terminal 102 in accordance with the Bluetooth standard. A network I/F 210 includes a NIC (Network Interface Card) for connection to the network 104. The above-described units can be connected via the internal bus to exchange data.

The hardware arrangement of the mobile terminal 102 will be described next. In the embodiment, the mobile terminal 102 is exemplified as an example of the information processing apparatus. The mobile terminal 102 is, for example, a handheld computer such as a smartphone or tablet PC that can be carried by the user. Note that the information processing apparatus according to this embodiment is not limited to this. For example, a wearable terminal represented by a smartwatch may be used. This embodiment is applicable to various kinds of devices that can cooperate with an external apparatus by wireless communication such as Bluetooth.

A CPU 211 controls the overall operation of the mobile terminal 102. A RAM 212 is a volatile memory used by the CPU 211 as a work area or the like to execute various programs. A flash memory 213 is a nonvolatile memory for storing various programs and data. An operation unit 214 includes a display operating as a touch panel that can be operated by a user's finger. The operation unit 214 functions as an acceptance unit that accepts a user operation and a display unit that displays information to the user. A Bluetooth I/F 215 is an interface for communication by Bluetooth, and mutually communicates with another apparatus including a Bluetooth interface. In the embodiment, the Bluetooth I/F 215 mutually communicates with the MFP 101 by Bluetooth. A wireless network I/F 216 includes a wireless-enabled NIC that can be connected to the wireless router 105 to perform network communication. A loudspeaker 217 is a device that converts an electronic signal of a sound into the sound. A microphone 218 detects a sound and converts it into an electronic signal. A camera 219 shoots a still image or moving image, and converts it into electronic data. GPS 220 is a receiver of Global Positioning System.

Assume that in the mobile terminal 102 according to the embodiment, the one CPU 211 executes respective processes shown in flowcharts (to be described later) using one memory (RAM 212). Assume also that the CPU 211 executes the processes of some of the flowcharts (to be described later) in cooperation with respective input/output hardware components and respective I/Fs connected to the internal bus. Note that the above-described implementation method is merely an example, and another form may be adopted. For example, a plurality of processors, RAMs, ROMs, and storages can be made to cooperate with each other to execute the processes illustrated in the flowcharts (to be described later). Furthermore, some processes can be executed in cooperation with a GPU (Graphics Processing Unit) (not shown) and the like.

FIGS. 3A and 3B are functional block diagrams for respectively explaining the software arrangements of the MFP 101 and the mobile terminal 102 according to the embodiment. Note that the software arrangement of the mobile terminal 103 is the same as that of the mobile terminal 102 and a description thereof will be omitted.

FIG. 3A is a block diagram showing the software arrangement of the MFP 101 and data areas managed by software. A document area 304, a print job area 305, a counter area 306, and a user account area 313 respectively indicate data areas of data recorded in the RAM 203 and HDD 204 and managed by the software. An OS (Operating System) 301 is formed by an operating system such as Linux®. The OS 301 includes a device driver group for controlling various hardware components, and provides an API for using the hardware components for an application operating on the OS. For example, a Bluetooth control module 302 is a device driver for controlling the Bluetooth I/F 209, and a network control module 303 is a device driver for controlling the network I/F 210. Although not shown, a printer module for controlling the printer 206 and a scanner module for controlling the scanner 207 also exist in the OS 301. The OS 301 provides, for an application, an API for reading/writing data from/in the document area 304, the print job area 305, and the counter area 306.

A copy application 308, a print application 309, and a transmission application 310 are applications operating on the OS 301, and each displays a user interface for providing various functions on the console unit 205. For example, the copy application 308 executes a copy operation by controlling the scanner 207 and the printer 206 via the OS 301. The print application 309 provides a function of printing document data stored in the document area 304 and a print job held in the print job area 305. Copy or print output is executed via the API of the OS 301, and the OS 301 records the number of printed sheets in the counter area 306. The transmission application 310 provides a function of externally transmitting document data acquired from the scanner 207. A menu module 307 is a module that displays a menu for selecting an application (for example, the copy, print, or transmission application) from the console unit 205. A remote UI 311 is a module that provides a user interface described in HTML when accessing the MFP from a web browser of the mobile terminal 102 by an HTTP protocol. The remote UI 311 provides a user interface for managing settings of the MFP 101 and a user interface for printing document data stored in the document area 304. A login service 312 provides a login function when the MFP 101 is used. The user account area 313 is a database that manages/saves the account ID and password of each user, and is stored in the RAM 203 or the HDD 204. The login service 312 externally provides a login service to the MFP 101 using the user account area 313.

The login service 312 determines whether to permit login of the user based on user information (user ID and password) input via the console unit 205 of the MFP 101. If login of the user is permitted, a screen that allows the use of the functions such as the copy and scan functions of the MFP 101 is displayed, and the user can use each function via the console unit 205. On the other hand, if login of the user is not permitted, or the user has not logged in, the use of each function is restricted. If the user has not logged in, the MFP 101 displays, on the console unit 205, a login screen for accepting login. The login service 312 provides a login service for logging in to the MFP 101 from an external apparatus.

FIG. 3B is a block diagram showing the software arrangement of the mobile terminal 102.

An authentication information area 319 indicates a data area of user information recorded in the flash memory 213 and managed by software. An OS 314 is an operating system for controlling the overall operation of the mobile terminal 102. The OS 314 is formed by, for example, Android® provided by Google or iOS® provided by Apple. The OS 314 includes a device driver group for controlling various hardware components, and provides an API for using the various hardware components to an application operating on the OS. In the embodiment, the device driver group includes an application notification control module 315, a Bluetooth control module 316 and a wireless network control module 317. The application notification control module 315 notifies an application 318 of information. The Bluetooth control module 316 is a device driver for controlling the Bluetooth I/F 215, and the wireless network control module 317 is a device driver for controlling the wireless network I/F 216. It is possible to install various applications in the mobile terminal 102, and cause them to operate on the OS 314. In the embodiment, assume that the application 318 is installed in advance. The application 318 has an authentication function to be described below.

User authentication information (user name/password) to be used for a login request is preset.

For this authentication function, a screen is prepared by a screen display module 322, the user inputs user authentication information in accordance with this screen, and the user authentication information is saved in the authentication information area 319 in the flash memory 213.

A screen for prompting the user to bring the mobile terminal 102 closer to the MFP 101 to log in to the MFP 101 is displayed by the screen display module 322.

Upon receiving a Bluetooth radio wave while this screen is displayed, the Bluetooth control module 316 measures the radio field intensity, and a proximity determination module 323 of the application 318 determines whether or not the mobile terminal 102 is in proximity to the MFP 101.

If the mobile terminal 102 is in proximity to the MFP 101, the mobile terminal 102 communicates with the MFP 101 to issue a login request.

An authentication control module 321 controls login request transmission, and the NFP 10.1 and the wireless network control module 317 wirelessly communicate with each other to transmit the login request to the NFP 101. For example, the login request is transmitted to the MFP 101 by GATT (Generic Attributes) communication of BLE (Bluetooth Low Energy) established with the NFP 101. This login request includes the user name/password stored in the authentication information area 319 in the flash memory 213.

Upon receiving the login request, in accordance with the login request from the mobile terminal 102, the MFP 101 determines whether or not to permit login of the user. The login service 312 determines whether or not the user authentication information included in the received login request is included in the user account area 313. If the user authentication information is included, login of the user is permitted.

If login is permitted, the MFP 101 displays, on the console unit 205, a screen that allows the use of the functions such as the copy and scan functions of the MFP 101 in accordance with the authority of the authenticated user. Thus, the user transits to a state in which the displayed function is usable via the console unit 205.

The user can cause a transition to a state in which each function of the MFP 101 is usable via the console unit 205 of the MFP 101 by merely bringing the mobile terminal 102 closer to the MFP 101. An operation of causing the user to log in to the NFP 101, and causing a transition to the state in which each function of the MFP 101 is usable via the console unit 205 will be referred to as multi-function peripheral panel login hereinafter.

Note that the functions of the modules (321 to 323) of the application 318 and the modules (315 to 317) of the OS 314 are implemented when the CPU 211 executes programs deployed in the RAM 212.

FIGS. 4A to 4D depict views each showing an example of a screen of the login function of the mobile terminal 102 according to the embodiment.

Figure 4A:
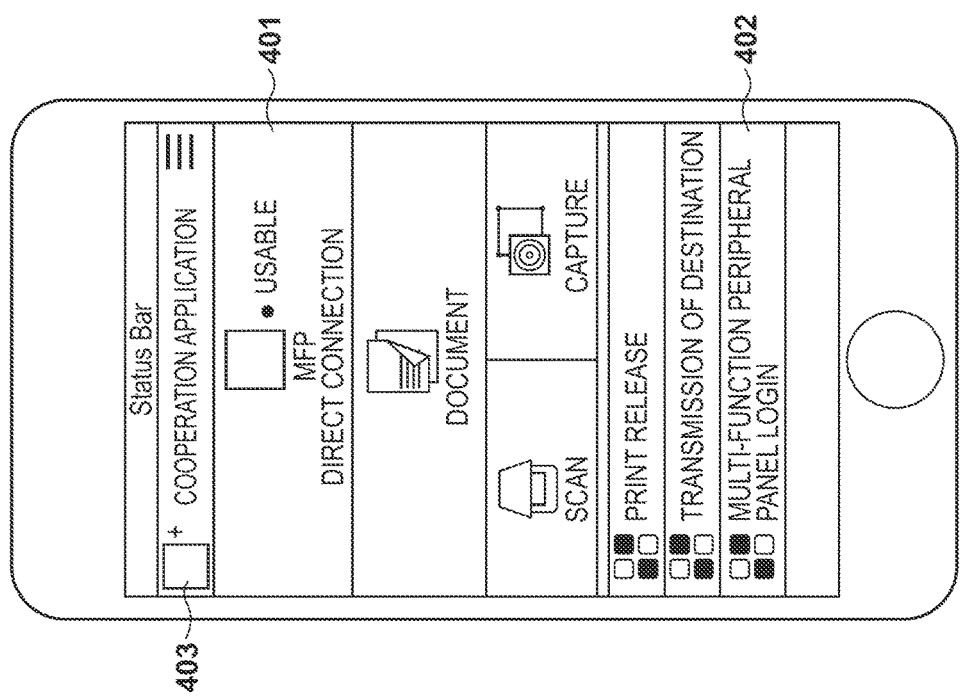

Upon activation, the application 318 installed in the mobile terminal 102 according to the embodiment displays a top menu screen shown in FIG. 4A on the screen of the operation unit 214 of the mobile terminal 102. A region 401 in this top menu screen displays the MFP 101 selected by the application. A multi-function peripheral panel login button 402 in the top menu screen provides a function of logging in to the MFP 101. When the user presses the button 402, a multi-function peripheral panel login screen shown in FIG. 4B is displayed. A printer registration function button 403 in the top menu screen provides a function of newly registering a printer. When the user presses the button 403, a printer registration screen shown in FIG. 7A is displayed.

FIG. 4B shows a screen example on which a multi-function peripheral panel login function is displayed. When the application 318 transits to this screen, the application 318 obtains, from the Bluetooth control module 316, the Bluetooth radio field intensity received from the MFP 101 by Bluetooth communication, and information of an advertising packet. The received Bluetooth radio field intensity is represented by an RSSI (Received Signal Strength Indication) in dBm.

The advertising packet includes the following data.
RSSI value (which indicates the radio field intensity of the received Bluetooth radio wave in dBm, for example, −40 dBm)
Local Name (which indicates identification information such as the name of a device, for example, ABC MFP CXXX)
Manufacturer Specific Data (which stores the identifier of a corporation and arbitrary data)
Service UUIDs (UUIDs representing the functions of the device)

Based on the name of the device and corporation identifier included in the information of the advertising packet of the received Bluetooth radio wave, the application 318 determines whether or not a partner apparatus is a printer for which the application 318 supports communication control. If the partner apparatus is a supported printer, the application 318 displays, on the screen of the operation unit 214, information 411 as the radio field intensity and printer information based on the information of the advertising packet included in the received Bluetooth radio wave.

Then, in accordance with an instruction of the screen shown in FIG. 4B, the user brings the mobile terminal 102 closer to the NFP 101 as the printer to be logged in to. While the screen shown in FIG. 4B is displayed, at a predetermined interval, the application 318 obtains the Bluetooth radio field intensity received from the Bluetooth control module 316 and determines whether or not a proximity condition is satisfied. If the proximity condition is satisfied, the application 318 transits to a screen shown in FIG. 4C. Alternatively, if the proximity condition is not satisfied for a predetermined time or longer, the application 318 transits to a detection error screen shown in FIG. 5. When the user presses a sensitivity adjustment button 412 of the screen shown in FIG. 4B, the application 318 transits to a sensitivity adjustment screen 601 shown in FIG. 6.

Figure 4C:
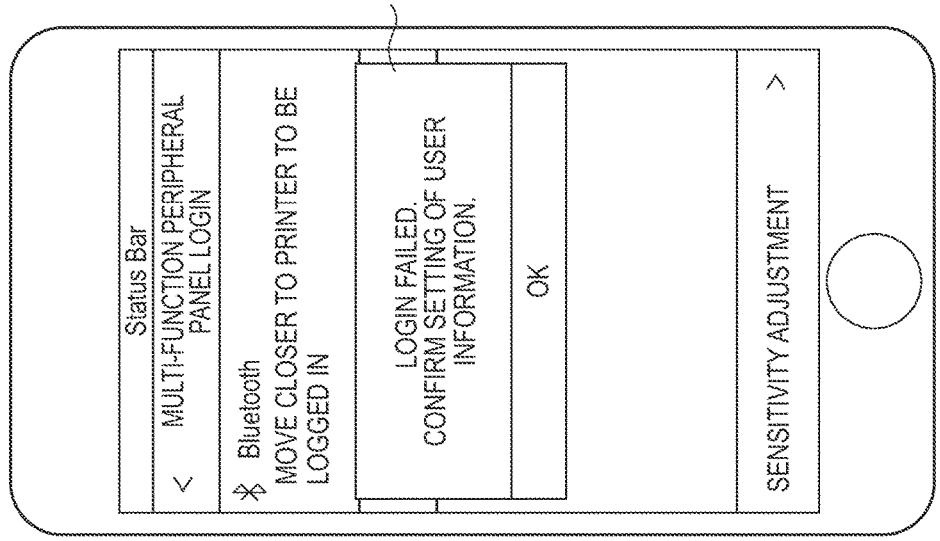

FIG. 4C shows an example of a dialog screen for making a notification that the multi-function peripheral panel login has succeeded. When the proximity condition is satisfied as a result of proximity determination, the application 318 transmits, to the MFP 101, a login request including the user name/password in the authentication information area 319. Upon receiving, from the MFP 101, a response indicating an authentication success, the application 318 displays, on a dialog box 421, information indicating that the user has logged in to the MFP 101.

Figure 4D:
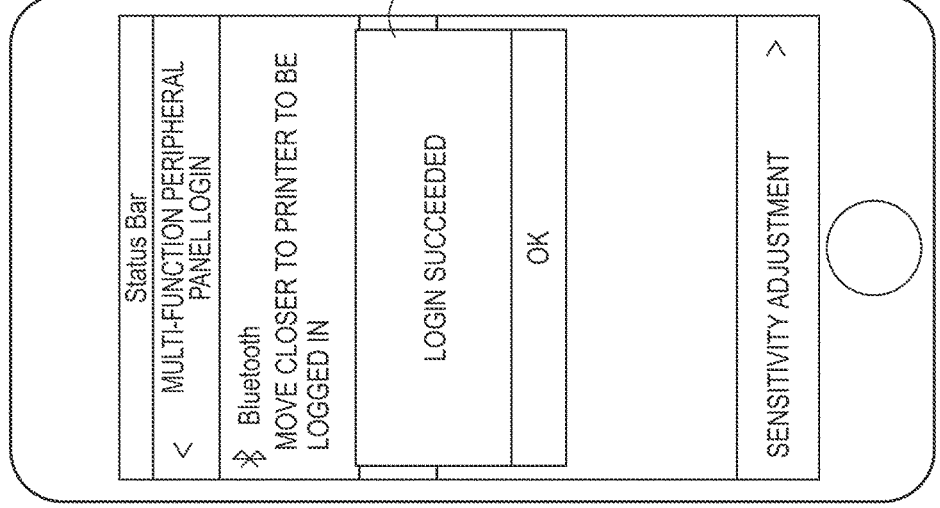

FIG. 4D depicts a view showing an example a dialog screen for making a notification that the multi-function peripheral panel login has failed.

When the proximity condition is satisfied as a result of proximity determination, the application 318 transmits, to the MFP 101, the login request including the user name/password in the authentication information area 319. Upon receiving, from the MFP 101, a response indicating an authentication failure, the application 318 displays, on a dialog box 431, information indicating that the user has failed to log in to the MFP 101. This dialog box 431 prompts the user to confirm the failure of the login and setting of the user information. Since as a factor for the failure of the authentication, the user name and password may not have been correctly set in the application 318, and thus the user is prompted to confirm the user name and password.

Figure 5:
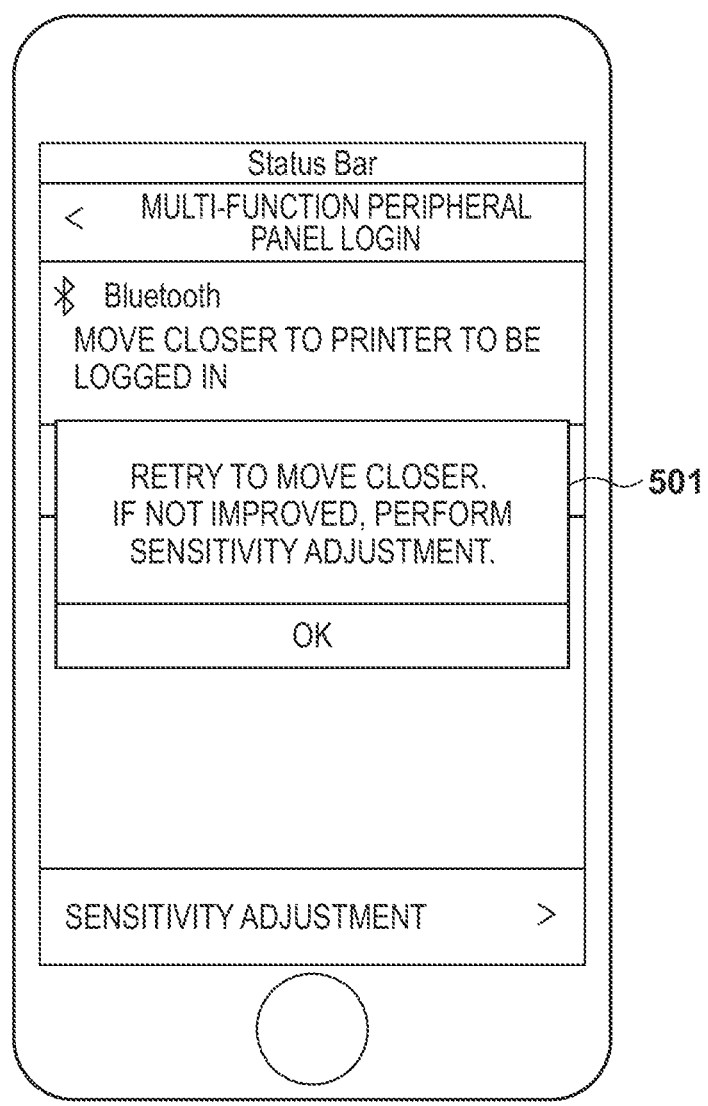
FIG. 5 depicts a view showing a detection error screen example displayed when a proximity condition is not satisfied in the mobile terminal according to the embodiment.

FIG. 5 depicts a view showing a detection error screen example displayed when the proximity condition is not satisfied in the mobile terminal 102 according to the embodiment.

When the proximity condition is not satisfied as a result of proximity determination a plurality of times, the application 318 displays, using a dialog box 501, on the operation unit 214, information indicating the failure of the login to the MFP 101. In this case, since sensitivity adjustment may not have been performed, the dialog box 501 also includes a message for prompting the user to perform sensitivity adjustment.

Figure 6:
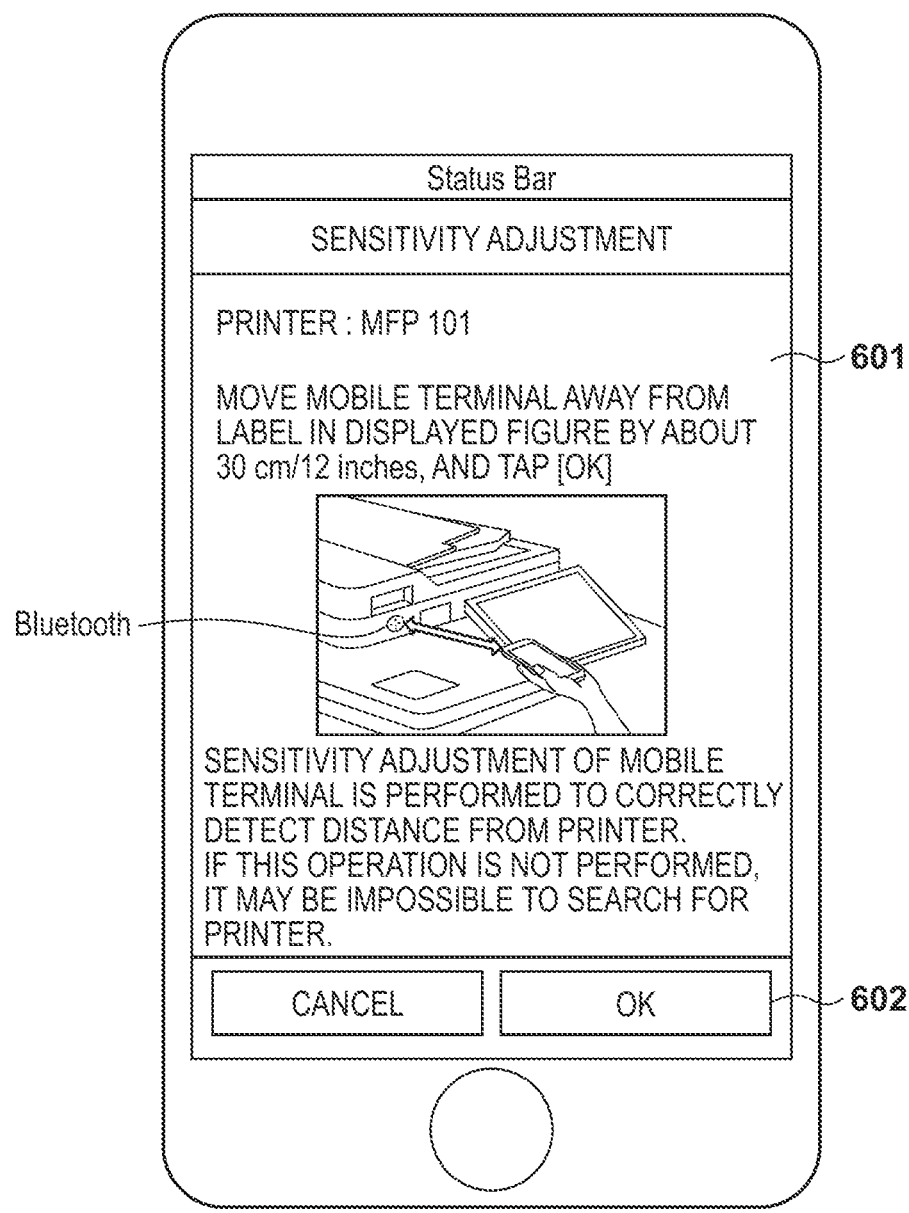
FIG. 6 depicts a view showing an example of the screen of the sensitivity adjustment function of the mobile terminal according to the embodiment.

FIG. 6 depicts a view showing an example of the screen of the sensitivity adjustment function of the mobile terminal 102 according to the embodiment.

The application 318 installed in the mobile terminal 102 according to the embodiment has the sensitivity adjustment function, and displays, upon the pressing of the sensitivity adjustment button 412 shown in FIG. 4B, the sensitivity adjustment screen 601 shown in FIG. 6 on the operation unit 214 of the mobile terminal 102. The sensitivity adjustment screen 601 displays the NFP 101 as a currently selected printer, and prompts the user to press an OK button 602 in a state in which the mobile terminal 102 is separated from the NFP 101 by about 30 cm/12 inches. When the user presses the OK button 602, the application 318 obtains the Bluetooth radio field intensity received from the Bluetooth control module 316, and saves the value in the flash memory 213 as a threshold to be used for proximity determination of the NFP 101. This screen operation registers, in the application 318, the MFF 101 having undergone sensitivity adjustment.

FIGS. 7A to 7D depict views each showing an example of the screen of the printer registration function of the mobile terminal 102 according to the embodiment.

The application 318 installed in the mobile terminal 102 according to the embodiment has the printer registration function. When the user presses the printer registration function button 403 of the top menu screen shown in FIG. 4A, a printer selection screen shown in FIG. 7A is displayed on the operation unit 214 of the mobile terminal 102.

FIG. 7A shows the printer selection screen that displays the currently selected NFP 101 and a registered LBP (Laser Beam Printer) in this example. As printer search functions, four methods are exemplified.

The first method is an automatic search (Wi-Fi®). Upon the pressing of an automatic search (Wi-Fi) button 701, the application 318 requests the wireless network control module 317 to execute broadcasting, and displays a detected printer.

The second method is a manual search (Wi-Fi). Upon the pressing of a manual search (Wi-Fi) button 702, the application 318 detects whether there exists a printer having an IP address input to the wireless network control module 317 by the user. The thus detected printer is displayed on the operation unit 214.

The third method is a QR Code®. Upon the pressing of a QR code button 703, the application 318 detects whether there exists a printer having an IP address input to the wireless network control module 317 by a QR code. The thus detected printer is displayed on the operation unit 214.

The fourth method is a nearby printer. Upon the pressing of a nearby printer button 704, the application 318 detects, by proximity wireless communication such as Bluetooth, whether there exists a printer around the MFP 101. Upon the pressing of the nearby printer button 704, the application 318 instructs to receive the radio wave of Bluetooth communication by the Bluetooth control module 316.

Figure 7B:
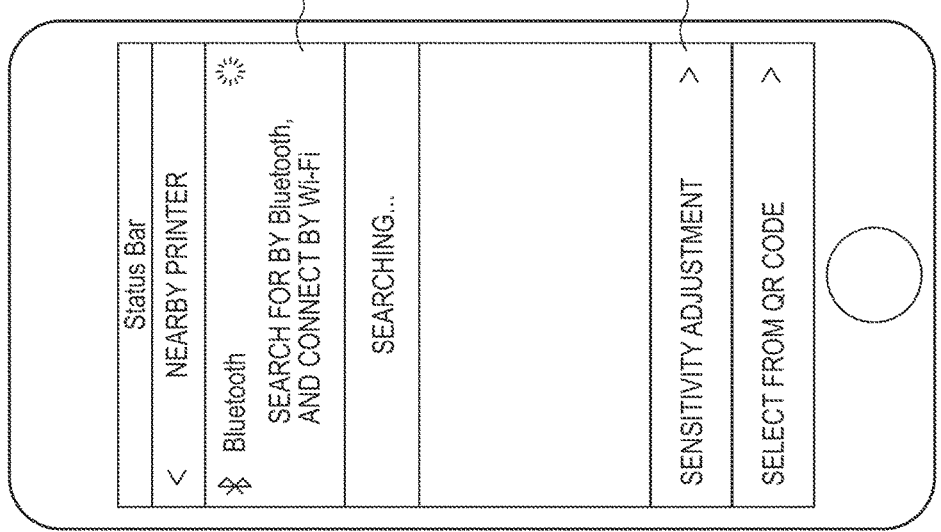
FIGS. 7A to 7D depict views each showing an example of the screen of the printer registration function of the mobile terminal according to the embodiment.
Figure 7A:
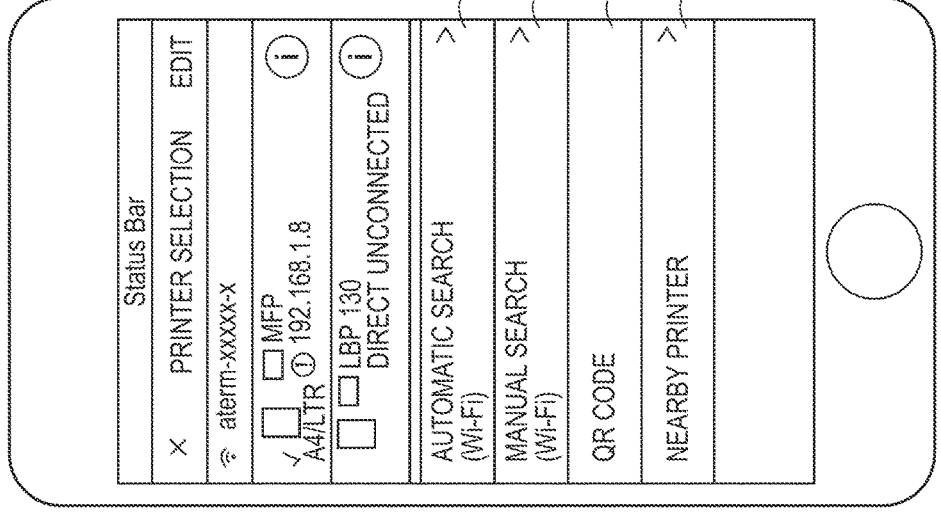

FIG. 7B shows a screen example while a nearby printer is being searched for by Bluetooth communication. The application 318 displays a search screen in a state in which the Bluetooth control module 316 stands by for reception of a radio wave. A message 711 indicates that a nearby printer is currently searched for by Bluetooth communication and if a printer is found, the printer is connected by Wi-Fi.

Figure 7D:
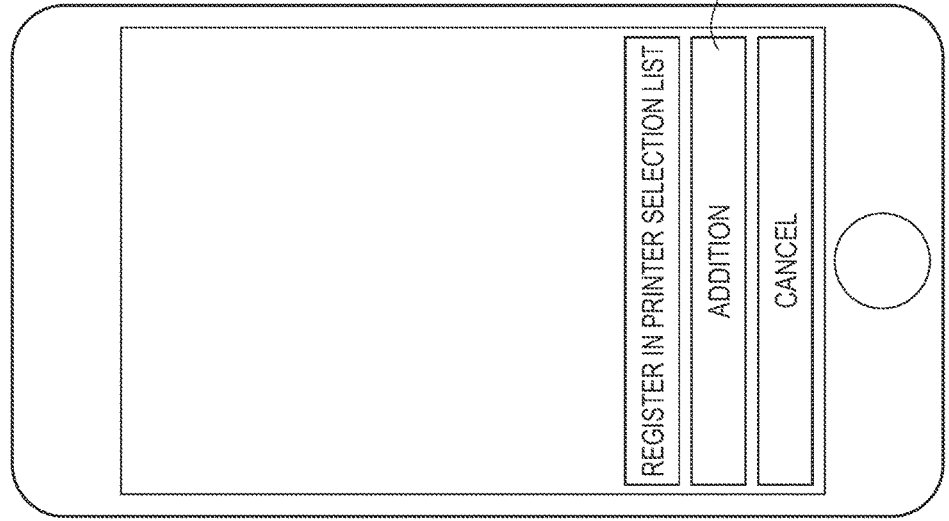
Figure 7C:
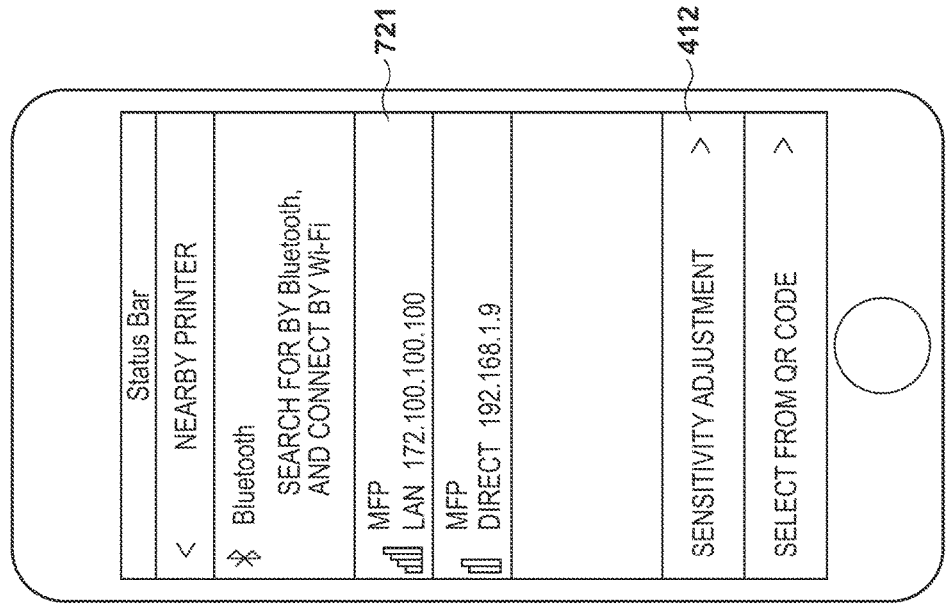

FIG. 7C shows a screen example on which a result of searching for a nearby printer by Bluetooth communication. The application 318 displays the search result screen when being notified of reception of a radio wave from the Bluetooth control module 316, and displays a printer button 721 based on the information of the advertising packet. When the user presses the found printer button 721 of the MFP 101, the application 318 transits to a printer registration screen shown in FIG. 7D to register the printer.

FIG. 7D shows a dialog screen for registering the nearby printer detected by Bluetooth communication. When the user presses an addition button 731, the application 318 transits to a printer selection screen shown in FIG. 8 to register the printer.

Figure 8:
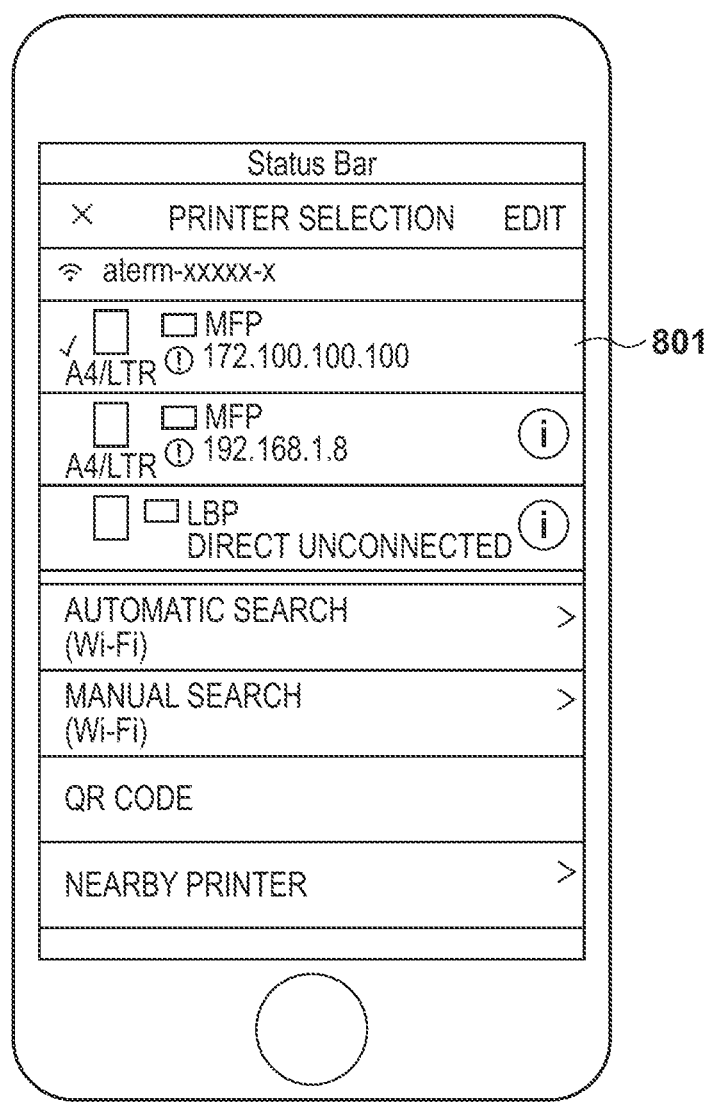
FIG. 8 depicts a view showing an example of a printer selection screen displayed on the operation unit of the mobile terminal according to the embodiment.

FIG. 8 depicts a view showing an example of the printer selection screen displayed on the operation unit 214 of the mobile terminal 102 according to the embodiment.

As denoted by reference numeral 801, an MFP is newly registered and selected. This printer registration operation registers, in the application 318, the NFP that has not undergone sensitivity adjustment. Note that in accordance with registration of a printer as a new cooperation destination using the nearby printer button 704, the application 318 may subsequently perform sensitivity adjustment (to be described later). Furthermore, if an NFP as a new cooperation destination is newly registered using the buttons 701 to 703, the MFP as the cooperation destination that has not undergone sensitivity adjustment is registered in the application 318. The user who wants to perform sensitivity adjustment for the printer can perform sensitivity adjustment for the printer by selecting the sensitivity adjustment button 412.

Figure 9:
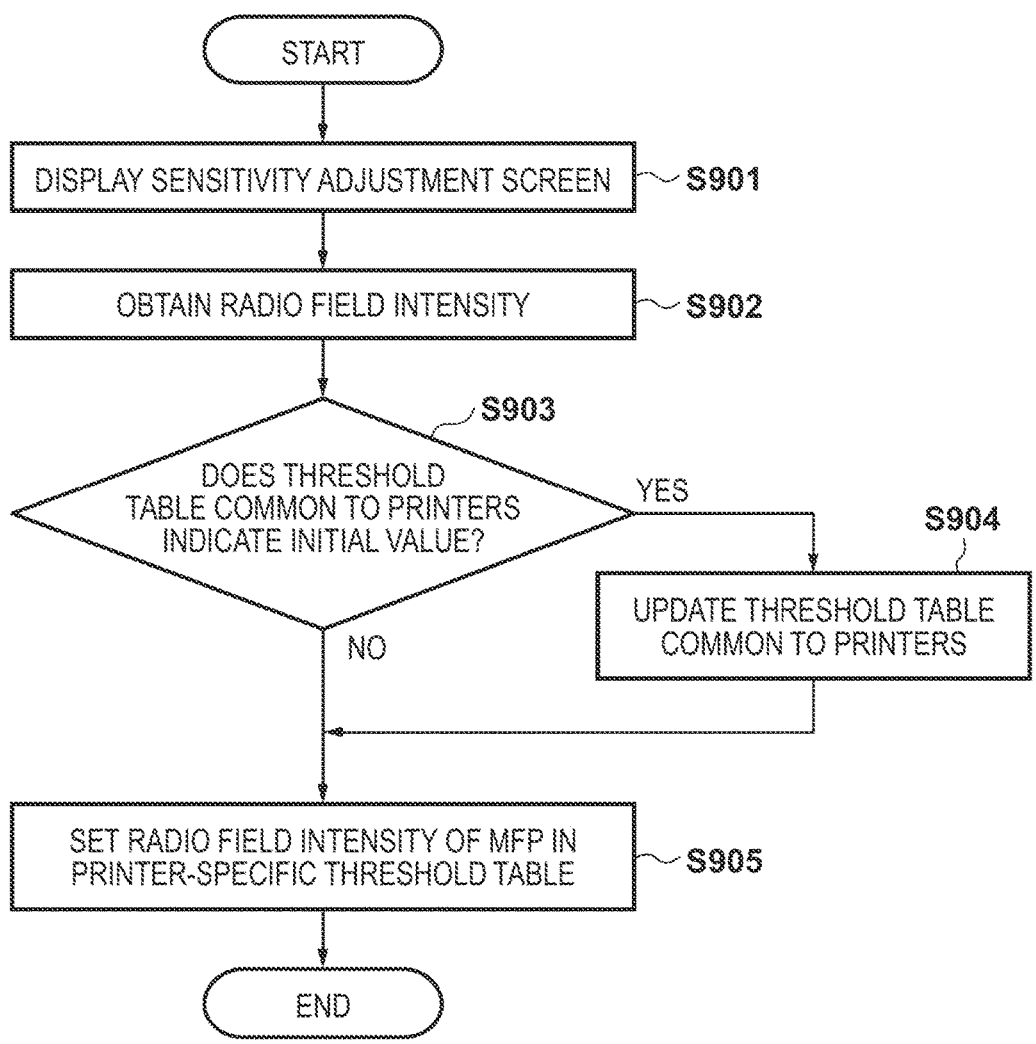
FIG. 9 is a flowchart for describing processing in which the mobile terminal receives a Bluetooth radio wave transmitted from the MFP and performs sensitivity adjustment according to the embodiment.

FIG. 9 is a flowchart for describing processing in which the mobile terminal 102 receives a Bluetooth radio wave transmitted from the MFP 101, and performs sensitivity adjustment according to the embodiment. Note that the processing illustrated by the flowchart is implemented when the CPU 211 executes a program deployed from the flash memory 213 in the RAM 212.

This processing starts when the user presses the sensitivity adjustment button 412. The sensitivity adjustment button 412 can be pressed from the multi-function peripheral panel login screen shown in FIG. 4B, the search screen of the nearby printer search function shown in FIG. 7B, and the search result screen shown in FIG. 7C.

In step S901, the CPU 211 executes the application 318 to display the sensitivity adjustment screen 601 shown in FIG. 6. In accordance with an instruction of the sensitivity adjustment screen 601, the user operates the OK button 602 in a state in which the mobile terminal 102 is separated from the MFP 101 as a target apparatus by about 30 cm. Then, the CPU 211 advances the process to step S902. In step S902, the CPU 211 obtains, from the Bluetooth I/F 215, the radio field intensity of a Bluetooth advertising packet transmitted from the NFP 101 as a setting apparatus. Note that it is possible to obtain the radio field intensities of a plurality of advertising packets (for example, 30 times) received after the OK button 602 is selected, and derive the radio field intensity by a median or average value. For example, the CPU 211 sorts an array storing the received intensities of the plurality of advertising packets, and extracts, as samples, a central portion (for example, a portion obtained by excluding the lower 10% and upper 10%) of the array. By setting the average value of the extracted samples as a threshold, the CPU 211 can avoid the influence of a disturbance caused by a peripheral wireless environment or the like. The process advances to step S903, and the CPU 211 determines whether or not the threshold is an initial value, with reference to a threshold table 1000 (FIG. 10A) held in the flash memory 213 and common to printers. If it is determined that the threshold is the initial value, the process advances to step S904, and the CPU 211 saves the obtained radio field intensity as a threshold in the threshold table 1000 common to the printers. The process then advances to step S905. On the other hand, if the CPU 211 determines in step S903 that the threshold in the threshold table 1000 common to the printers is not the initial value, the process advances to step S905. In step S905, the CPU 211 saves the obtained radio field intensity as the threshold of the MFP 101 in a printer-specific threshold table 1001 (FIG. 10B), thereby ending the processing.

This processing allows the mobile terminal 102 to register, in association with the selected registered NFP (partner apparatus), the threshold to be used for proximity determination with respect to the MFP.

FIGS. 10A and 10B depict views illustrating tables each showing an example of the threshold table used by the CPU 211 of the mobile terminal 102 to perform proximity determination with respect to the MFP 101 according to the embodiment. These threshold tables are held in the flash memory 213.

FIG. 10A shows a view illustrating an example of the threshold table 1000 common to the printers, which stores the threshold to be used for proximity determination in common to the plurality of printers. This common threshold is held when the CPU 211 executes the application 318, and the initial value of the threshold common to the printers is stored in the flash memory 213 when installing the application 318. Furthermore, every time the radio field intensity is obtained by performing sensitivity adjustment of a given printer, the threshold table common to the printers may be overwritten and updated with the radio field intensity specific to the printer. Alternatively, an average value of the initial value and the obtained radio field intensity may be calculated and the threshold table common to the printers may be updated with the calculated average value.

FIG. 10B shows a view illustrating an example of the printer-specific threshold table 1001. The printer-specific threshold table 1001 holds a threshold to be used for proximity determination for each printer. As for a printer (MFP (corresponding to the MFP 101 of the embodiment), LBP) that has undergone sensitivity adjustment and been registered, a threshold to be used for proximity determination is set. On the other hand, as for a printer (MFP-1) registered without sensitivity adjustment being performed, no threshold to be used for proximity determination is set. For the printer (MFP-1) having no individual threshold, the threshold table 1000 common to the printers, shown in FIG. 10A, is used for proximity determination with respect to the printer.

FIG. 11 is a flowchart for describing processing when the mobile terminal 102 is brought closer to the MFP 101 to log in to the NFP 101 according to the embodiment. Note that the processing illustrated by the flowchart is implemented when the CPU 211 executes a program deployed from the flash memory 213 in the RAM 212.

In step S1101, the CPU 211 displays the login screen shown in FIG. 4B on the operation unit 214. The process advances to step S1102, and the CPU 211 receives the Bluetooth radio field intensity from the Bluetooth control module 302. At this time, while the login screen shown in FIG. 4B is displayed, the CPU 211 obtains, a plurality of times at a predetermined interval, the Bluetooth radio field intensity periodically received from the Bluetooth control module 316. The average value of the received radio field intensities is obtained, and set as the received Bluetooth radio field intensity. Next, the process advances to step S1103, and the CPU 211 specifies a partner printer from the advertising packet of the received Bluetooth radio wave, and determines whether or not a threshold for proximity determination corresponding to the printer exists in the printer-specific threshold table 1001. If it is determined that the threshold exists, the process advances to step S1105 to obtain the threshold for proximity determination of the printer, and then advances to step S1107.

On the other hand, if it is determined in step S1103 that there is no threshold for proximity determination of the partner printer, the process advances to step S1104. In step S1104, the CPU 211 determines whether or not the threshold common to the printers exists in the threshold table 1000 common to the printers. If it is determined that the common threshold exists, the process advances to step S1106, and the CPU 211 sets the threshold in the threshold table 1000 common to the printers as the threshold for proximity determination, and advances the process to step S1107. On the other hand, if it is determined that there is no threshold common to the printers in the threshold table 1000 common to the printers, the process advances to step S1111.

In step S1107, the CPU 211 compares the threshold for proximity determination determined in step S1106 or S1105 with the radio field intensity obtained in step S1102. The process advances to step S1108. If, as a result of the comparison, the CPU 211 determines that the radio field intensity is higher than the threshold for proximity determination, the process advances to step S1110. In step S1110, since the proximity determination condition is satisfied, the CPU 211 transmits, as login information, the user information saved in the authentication information area 319 to the MFP 101 via the wireless network control module 317. In step S1112, the CPU 211 receives information indicating whether or not authentication has succeeded in the MFP 101. If authentication has succeeded, the process advances to step S1113, and the CPU 211 displays the login success screen shown in FIG. 4C on the operation unit 214, thereby ending the processing. If it is determined in step S1112 that the authentication has failed, the process advances to step S1114, and the CPU 211 displays, on the operation unit 214, the authentication error screen shown in FIG. 4D to indicate the failure of login to the MFP 101, thereby ending the processing.

If it is determined in step S1108 that the radio field intensity is equal to or lower than the threshold for proximity determination, the process advances to step S1109. In step S1109, the CPU 211 determines whether or not a state in which the condition for determining whether the mobile terminal is in proximity to the MFP is not satisfied has continued for a predetermined time. The value of the predetermined time is held in the flash memory 213 in advance. If the state in which the determination condition is not satisfied has not continued for the predetermined time, the process returns to step S1102 to receive the radio wave again. On the other hand, if it is determined that the state in which the determination condition is not satisfied has continued for the predetermined time, the process advances to step S1111, and the CPU 211 displays the detection error screen shown in FIG. 5 on the operation unit 214. Then, the process advances to step S1115, and the CPU 211 displays, on the operation unit 214, the sensitivity adjustment button 412 for transiting to the screen where sensitivity adjustment can be performed. If the user presses the sensitivity adjustment button 412 to instruct sensitivity adjustment, the sensitivity adjustment flowchart shown in FIG. 9 is executed.

As described above, according to the embodiment, it is possible to appropriately perform proximity determination when the mobile terminal logs in to the target apparatus. Furthermore, it is possible to obtain the effect capable of performing proximity determination for an apparatus having undergone sensitivity adjustment in accordance with the characteristic of the apparatus.

On the other hand, since proximity determination is performed using the common threshold for an apparatus having undergone no sensitivity adjustment, it is possible to omit the user's labor for performing sensitivity adjustment in advance.

Furthermore, it is possible to perform, for an apparatus whose specific threshold is registered, sensitivity adjustment in accordance with the apparatus. Therefore, if proximity determination cannot be performed appropriately when the common threshold is used, the user can individually perform sensitivity adjustment in accordance with the apparatus. By this, it is possible to perform appropriate proximity determination in accordance with each apparatus, thereby improving convenience for the user.

(Modification)

This embodiment has exemplified a case in which the received intensity is stored as a determination threshold, as shown in FIGS. 10A and 10B. The present invention, however, is not limited to this. For example, the threshold can be stored in a form of a difference value (offset) with respect to a radio field intensity as a reference or the like. This embodiment has exemplified a case in which the degree of proximity of an external apparatus such as an MFF around the mobile terminal 102 is determined using the received signal intensity of the advertising packet. The present invention, however, is not limited to this. For example, the distance between devices may be estimated based on the ratio between the transmitted signal intensity (Tx) included in the advertising packet and the received signal intensity, and the degree of proximity may be determined based on the distance. In this case, the distance is stored as the threshold for proximity determination, instead of the received signal intensity described with reference to FIGS. 10A and 10B. Furthermore, for example, the degree of proximity between a communication terminal and a login target external apparatus can be determined by another method such as Wi-Fi Aware®. In this case, a threshold based on an RTT (Round Trip Time) of wireless communication between devices is stored as the threshold for proximity determination.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-099213, filed May 18, 2017, which is hereby incorporated by reference herein in its entirety.

What is claimed is:

1. A non-transitory computer readable storage medium storing a program for causing a processor to execute a method of controlling a communication terminal having a wireless communication function, the method comprising:
obtaining an intensity of a received radio wave;
saving, in a memory, a first threshold set in common to a plurality of apparatuses and a second threshold set in association with each apparatus, the first and second thresholds being compared with the obtained intensity of the radio wave to determine whether or not an apparatus that has transmitted the radio wave and the communication terminal are in a predetermined proximity state;
determining, by comparing the obtained intensity of the radio wave with one of the first threshold and the second threshold saved in the memory, whether or not the apparatus that has transmitted the radio wave and the communication terminal are in proximity to each other; and
updating, in accordance with an update instruction, one of the first threshold and the second threshold saved in the memory.

2. The non-transitory computer readable storage medium according to claim 1, the method further comprising displaying a screen used by a user to input the update instruction,
wherein the screen displays a message for prompting the user to bring the information processing apparatus close to a printing apparatus within a predetermined distance.

3. The non-transitory computer readable storage medium according to claim 2, wherein in the updating, one of the first threshold and the second threshold saved in the memory is updated based on the obtained intensity of the radio wave from the target apparatus in accordance with acceptance of the update instruction by the communication terminal via the screen.

4. The non-transitory computer readable storage medium according to claim 2, wherein in the updating, in a case that the first threshold saved in the memory is an initial value, the first threshold and the second threshold corresponding to the target apparatus are updated based on the obtained intensity of the radio wave from the target apparatus.

5. The non-transitory computer readable storage medium according to claim 4, wherein in the updating, in a case that the first threshold saved in the memory is an initial value, an average value of the initial value and the obtained intensity of the radio wave from the target apparatus is obtained and the first threshold and the second threshold corresponding to the target apparatus are updated with the average value.

6. The non-transitory computer readable storage medium according to claim 2, wherein the radio wave includes identification information of the apparatus that has transmitted the radio wave, and
in the updating, the second threshold corresponding to the target apparatus is updated based on the obtained intensity of the radio wave from the target apparatus.

7. The non-transitory computer readable storage medium according to claim 6, wherein in the determining, if the second threshold corresponding to the apparatus that has transmitted the radio wave is not saved, the obtained intensity of the radio wave is compared with the first threshold saved in the memory, and it is determined whether or not the apparatus that has transmitted the radio wave and the communication terminal are in proximity to each other.

8. The non-transitory computer readable storage medium according to claim 5, wherein in the determining, if the second threshold corresponding to the apparatus that has transmitted the radio wave is saved, the obtained intensity of the radio wave is compared with the second threshold saved in the memory and corresponding to the apparatus, and it is determined whether or not the apparatus that has transmitted the radio wave and the communication terminal are in proximity to each other.

9. The non-transitory computer readable storage medium according to claim 1, the method further comprising performing, if a state in which it is impossible to determine in the determining whether or not a distance to the apparatus that has transmitted the radio wave becomes not longer than the predetermined distance continues for a predetermined time, display to prompt a user to update the threshold saved in the memory.

10. The non-transitory computer readable storage medium according to claim 2, wherein in the updating, one of the first threshold and the second threshold saved in the memory is updated based on an average value of the obtained intensities of the plurality of radio waves from the target apparatus.

11. The non-transitory computer readable storage medium according to claim 1, the method further comprising logging in to the apparatus for which it has been determined in the determining that the apparatus that has transmitted the radio wave and the communication terminal are in proximity to each other.

12. The non-transitory computer readable storage medium according to claim 1, wherein the obtained intensity of the radio wave is an intensity of a radio wave carrying an advertising packet of Bluetooth Low Energy.

13. The non-transitory computer readable storage medium according to claim 12, wherein the apparatus that transmits the radio wave carrying the advertising packet of Bluetooth Low Energy is a printing apparatus.

14. A method of controlling a communication terminal having a wireless communication function, comprising:
obtaining an intensity of a received radio wave;
saving, in a memory, a first threshold set in common to a plurality of apparatuses and a second threshold set in association with each apparatus, the first and second thresholds being compared with the obtained intensity of the radio wave to determine whether or not an apparatus that has transmitted the radio wave and the communication terminal are in a predetermined proximity state;
determining, by comparing the obtained intensity of the radio wave with one of the first threshold and the second threshold saved in the memory, whether or not the apparatus that has transmitted the radio wave and the communication terminal are in proximity to each other; and
updating, in accordance with an update instruction, one of the first threshold and the second threshold saved in the memory.

15. A communication terminal having a wireless communication function, comprising:
a memory device that stores a set of instructions; and
at least one processor that executes the instructions stored in the memory device to function as:
an obtaining unit that obtains an intensity of a received radio wave;
a saving unit that saves a first threshold set in common to a plurality of apparatuses and a second threshold set in association with each apparatus, the first and second thresholds being compared with the intensity of the radio wave obtained by the obtaining unit to determine whether or not an apparatus that has transmitted the radio wave and the communication terminal are in a predetermined proximity state;
a determination unit that determines, by comparing the intensity of the radio wave obtained by the obtaining unit with one of the first threshold and the second threshold saved in the saving unit, whether or not the apparatus that has transmitted the radio wave and the communication terminal are in proximity to each other; and
an update unit that updates, in accordance with an update instruction, one of the first threshold and the second threshold saved in the saving unit.

* * * * *